United States Patent [19]

Glue

[11] Patent Number: 4,854,539
[45] Date of Patent: Aug. 8, 1989

[54] EXTERIOR REAR VIEW MIRROR

[75] Inventor: William J. Glue, Chichester, England

[73] Assignee: Britax Wingard Limited, England

[21] Appl. No.: 211,348

[22] Filed: Jun. 24, 1988

[30] Foreign Application Priority Data

Jun. 26, 1987 [GB] United Kingdom ............... 8714991

[51] Int. Cl.⁴ .......................................... A47G 1/24
[52] U.S. Cl. .................................... 248/479; 248/487
[58] Field of Search .............. 248/479, 481, 483, 484, 248/485, 486, 487, 476, 478; 350/604, 632; 74/502.1

[56] References Cited

U.S. PATENT DOCUMENTS

| | | | |
|---|---|---|---|
| 2,596,632 | 5/1952 | Whitehead | 248/487 X |
| 3,322,388 | 5/1967 | Budreck | 248/478 X |
| 4,125,244 | 11/1978 | Lukey | 248/900 X |
| 4,244,548 | 1/1981 | Sharp | 248/481 |
| 4,523,735 | 6/1985 | Beck et al. | 248/479 X |
| 4,692,000 | 9/1987 | Wada et al. | 248/478 X |
| 4,728,181 | 3/1988 | Kakinuma | 248/487 X |
| 4,733,846 | 3/1988 | Kakinuma | 248/479 |

FOREIGN PATENT DOCUMENTS 0879336 10/1961 United Kingdom ............... 248/900

Primary Examiner—Ramon O. Ramirez
Attorney, Agent, or Firm—Davis, Bujold & Streck

[57] ABSTRACT

An exterior rear view mirror assembly has a base member adapted to be fixed to the body of a vehicle and carrying a first detent formation located at a predetermined radius from a substantially vertical axis. A mirror support member is mounted on the base member for angular movement about this vertical axis. A detent carrier which is also angularly movable about said vertical axis, carries a second detent formation confronting said first detent formation at the same radius from said vertical axis. Clamping means are arranged to secure the detent carrier to the mirror support member at a selected one of a multiplicity of orientations relative thereto.

1 Claim, 1 Drawing Sheet

EXTERIOR REAR VIEW MIRROR

This invention relates to an exterior rear view mirror assembly comprising a base member adapted to be fixed to the body of the vehicle and carrying a first detent formation located at a predetermined radius from a substantially vertical axis, a mirror support member pivotally mounted on the bse member for angular movement about said vertical axis and carrying a second detent formation confronting said first detent formation at the same radius from said vertical axis, and resilient means for urging said detent formations into abutment with each other to retain the mirror housing at a predetermined orientation relative to the support. A mirror assembly of this type is disclosed in patent specification EP-A-0079677.

The optimum orientation of the support member relative to the base member depends on the position of the driver's seat relative to the base member. This differs from one vehicle model to another and also differs depending on whether the mirror is mounted on the driver's side or the passenger's side of the vehicle. In order to permit the same mirror assembly to be used as a driver's side mirror and a passenger's side mirror, the aforesaid EP specification discloses the provision of a second set of detent formations located at a second radius from said vertical axis so as to retain the said mirror housing in a second orientation relative to the support. However, particularly with commercial vehicles, the same design of mirror may be used on more than one vehicle model, each vehicle model requiring a different orientation of the support member relative to the base member. There is obviously a practical limit to the number of different radii at which sets of detent formations which can be located.

According to the invention, in a rear view mirror assembly of the type described above, one of the detent formations is mounted on a carrier which is angularly movable about said vertical axis, clamping means being provided for securing said one detent formation to the member on which it is carried at a selected one of a multiplicity of orientations relative thereto.

Preferably the clamping means comprises a bowed element having one end engaging with an abutment on the member carrying said detent formation and the other end having a locking formation arranged to engage with a complementary locking formation on the carrier in a multiplicirty of alternative relative positions, and thrust means acting on the bowed element at an intermediate position between its ends so as to tend to straighten the bowed element and thereby urge the locking formations into engagement with each other.

An embodiment of the invention will now be described, with reference to the accompanying drawing, in which.

Figure 1:
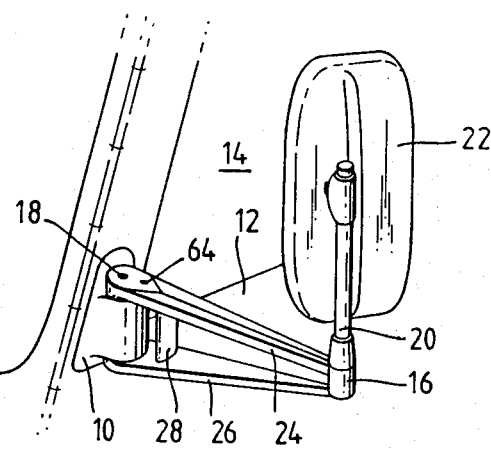
FIG. 1 is a side view of a mirror assembly in accordance with the invention.

FIG. 1 shows an exterior rear view mirror for a commercial vehicle. A base member 10 is mounted on the front edge of a door 12 of the driver's cab, level with the bottom of a window 14 therein. A mirror support arm 16 is pivotally mounted on the base member 10 so as to project horizontally and to be pivotable about a vertical axis defined by a bolt 18. On its outer end, the arm 16 carries a pillar 20 which supports a mirror housing 22.

Figure 2:
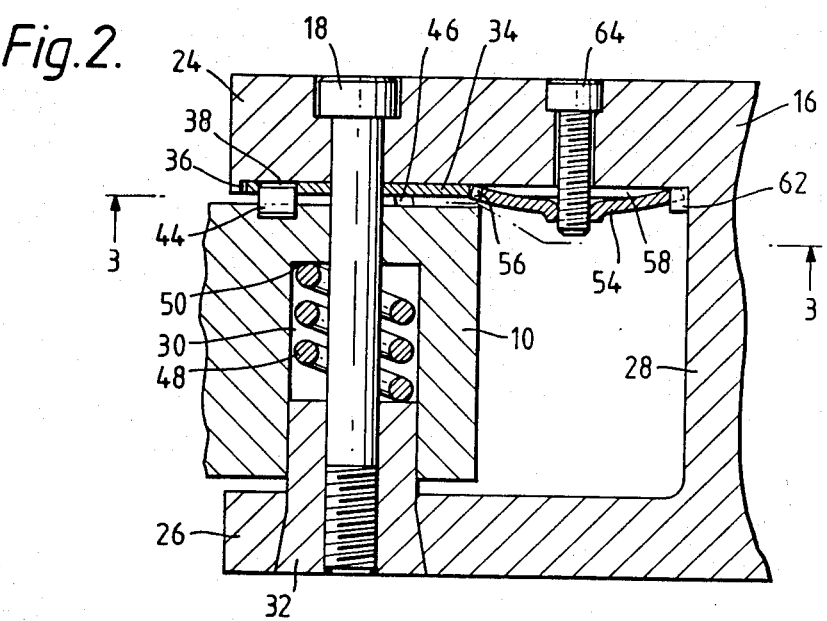
FIG. 2 is a vertical sectional view of part of the assembly shown in FIG. 1.

The mirror support arm 16 has upper and lower arm portion 24 and 26 which project above and below the base member 10 and which are interconnected by a strut 28. As can be seen in FIG. 2, the bolt 18 extends through a bore 30 in the upper arm portion 24, through the base member 10 and into threaded engagement with a frustoconical nut 32 which is received in a tapering hole in the lower arm portion 26.

Figure 3:
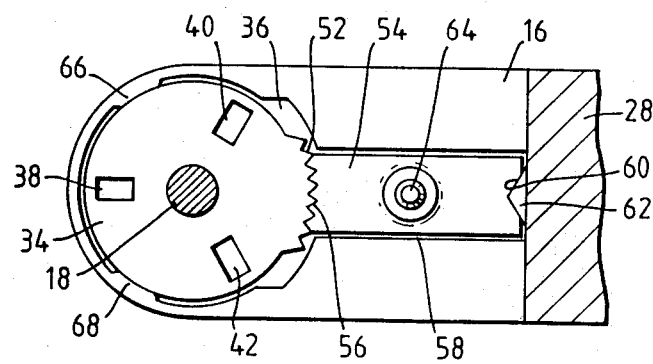
FIG. 3 is a cross-sectional view taken on the line 3—3 in FIG. 2.

A detent carrier 34 in the form of a basically circular disk, is mounted on the bolt 18 and accommodated in a circular recess 36 in the lower surface of the upper arm portion 24 and the base member 10. As can be seen from FIG. 3, the detent carrier 34 has three radially oriented rectangular openings 38, 40 and 42 uniformly spaced around the bolt 18. Three rollers, none of which are shown in FIG. 3 but two of which are visible at 44 and 46 in FIG. 2, are located in respective pockets in the top surface of the base member 10 confronting the detent carrier 34. These rollers are uniformly spaced around the bolt 18 at the same radius as the openings 38, 40 and 42 and their diameter is greater than the width of the openings 38, 40 and 42 so that each roller engages with the edges of a respective opening and does not project completely through the detent carrier 34. A compression spring 48 engages between the top of the nut 32 and a shoulder 50 in the bore 30 so as to urge the rollers 44 and 46 towards the detent carrier 34.

The detent carrier 34 has a set of teeth 52 on its edge facing the strut 28. A metal strip 54, having complementary teeth 56 on one end, is accommodated in a rectangular recess 58 in the lower surface of the upper arm portion 24, extending from the circular recess 36 to the strut 28. On its opposite end to the teeth, the strip 54 has a V-shaped notch 60 which engages with a V-shaped projection 62 on the strut 28. The length of the strip 54 is greater than the distance between the detent carrier 34 and the strut 28, the strip 54 being bowed so as to fit in place. A screw 64 extends through a hole in the upper arm portion 24, into a tapped hole in the centre of the strip 54. Tightening the screw 64 tends to straighten the strip 54, thereby wedging it firmly between the detent carrier 34 and the strut 28. To prevent the resulting thrust being applied to the bolt 18, the circular recess 36 has two lands 66 and 68 (FIG. 3) which engage with the periphery of the detent carrier 34. In use, the arm 16 is first set at an angle to the base member 10 suitable for the vehicle on which it is to be installed and the screw 64 is then tightened so that the strip 54 firmly holds the arm 16 relative to the detent carrier 34. This setting is not usually altered subsequently, adjustment of the orientation of the mirror being effected by angular movement of the housing 22 relative to the pillar 20. If sufficient force is applied to the arm 16 to displace the rollers 44, 46 out of the openings 38, 40 and 42 in the detent plate 34, against the action of the spring 48, the arm 16 can be folded backwards or forwards against the side of the vehicle. When the arm is restored to its original position, the rollers 44, 46 snap back into their respective recesses 38, 40, 42 in the detent carrier 34.

I claim:

1. An exterior rear view mirror assembly comprising a base member adapted to be fixed to the body of a vehicle and carrying a first detent formation located at a predetermined radius from a substantially vertical axis, a mirror support member pivotally mounted on the base member for angular movement about said vertical axis and carrying a second detent formation confronting said first detent formation at the same radius from said vertical axis, and resilient means for urging said detent formations into abutment with each other to retain the mirror support member at a predetermined orientation relative to the base member, one of the detent formations being mounted on a detent carrier which is angularly movable about said vertical axis, and a bowed element having one end engaging with an abutment on the member carrying said detent formation and the other end having a locking formation arranged to engage with a complementary locking formation on the detent carrier in a multiplicity of alternative relative positions, and thrust means acting on the bowed element at an intermediate position between its ends so as to tend to straighten the bowed element and thereby urge the locking formations into engagement with each other, thus securing said one detent formation to the member on which it is carried at a selected one of a multiplicity of orientations relative thereto.

* * * * *